May 24, 1960

W. O. JONES 2,937,896

MEANS FOR SEALING ROTATING SHAFTS

Filed May 9, 1956

2 Sheets-Sheet 1

INVENTOR
Walter O. Jones

United States Patent Office 2,937,896
Patented May 24, 1960

2,937,896

MEANS FOR SEALING ROTATING SHAFTS

Walter O. Jones, Warren, Ohio, assignor to The Wean Engineering Company, Inc., Warren, Ohio, a corporation of Ohio Filed May 9, 1956, Ser. No. 583,714

5 Claims. (Cl. 288—3)

This invention relates to means for sealing rotating shafts in an opening against passage of a fluid from one side of the seal to the other side.

Heretofore, various attempts have been made to seal rotating shafts in an opening against passage of a fluid from one side of the seal to the other, but no seal is known to me which is completely leakproof under all conditions which may be encountered. When the fluid which is sought to be retained is corrosive or poisonous, leakage through the seal, even in small quantities, may be dangerous to health and harmful to surrounding equipment such as shaft bearings adjacent the seal. It has previously been necessary to install such seals during field erection of equipment. This has involved difficulty due to interference with other assembly operation and manipulation of heavy structures such as the rotating shafts themselves. Carbon seals have frequently been employed because they exhibit less leakage than many other types of seals. Carbon seals, in particular, have the great disadvantage that they are fragile and subject to breakage or chipping, particularly during installation on the shaft which is to be sealed. Such chipping destroys their utility and frequently requires that the entire seal assembly be removed and reinstalled with new parts.

I provide a sleeve surrounding at least a portion of the shaft adjacent the opening and in sealing relationship to the shaft, means surrounding the sleeve and in sealing relationship to the opening, the sleeve and the surrounding means forming a cavity therebetween, and sealing means placed within the cavity in sealing relationship to the sleeve and the surrounding means. Preferably, I substantially close the cavity at the ends, but make it accessible at at least one end. I further preferably provide a plurality of seal means within the cavity comprising sealing means between the sleeve and the surrounding means. I further prefer to introduce a fluid into the cavity at a pressure greater than the pressure on the opposite sides of the seals therefrom.

Other details, objects and advantages of my invention will become apparent as the following description of a present preferred embodiment thereof proceeds.

Figure 1:
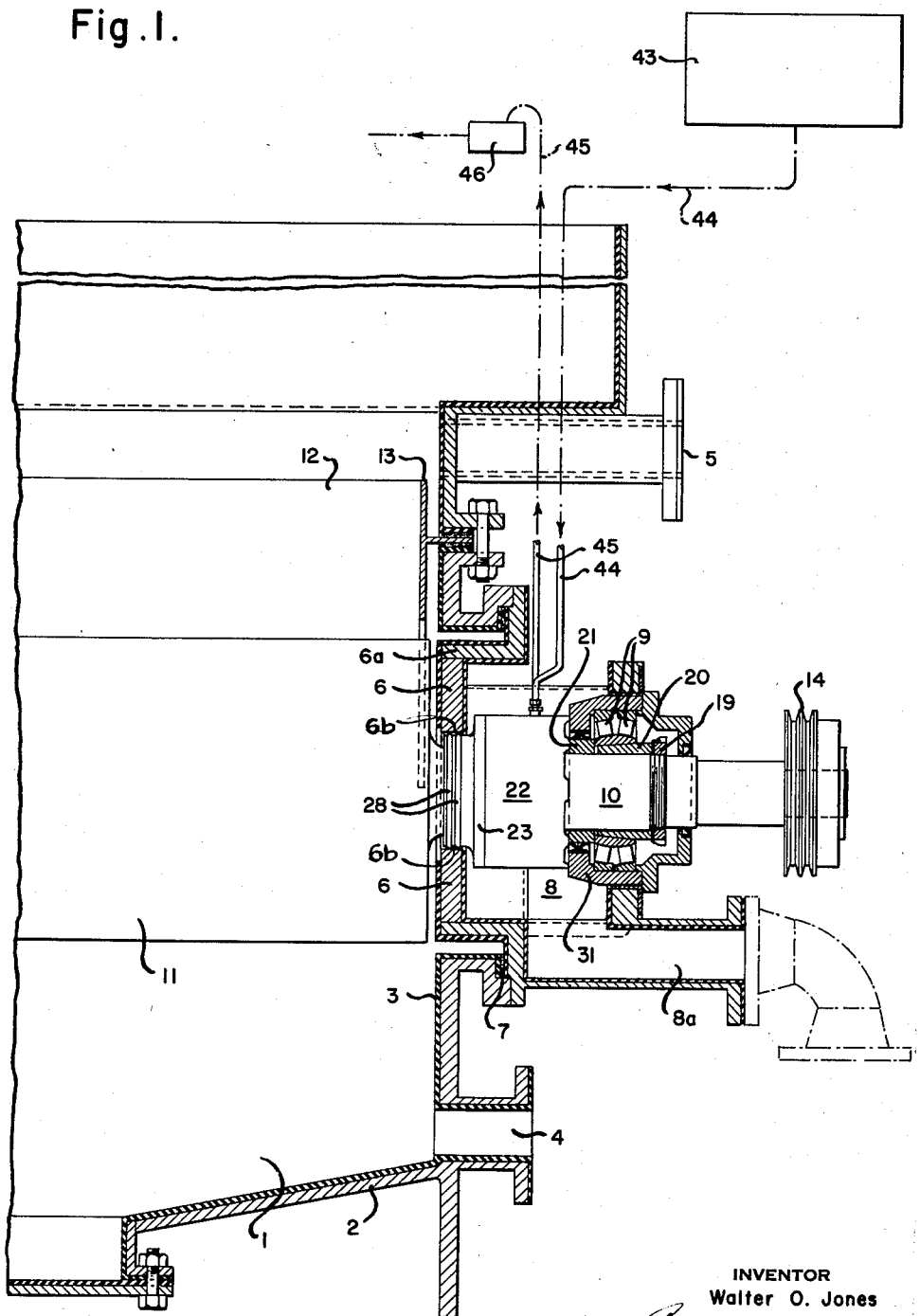
Figure 2:
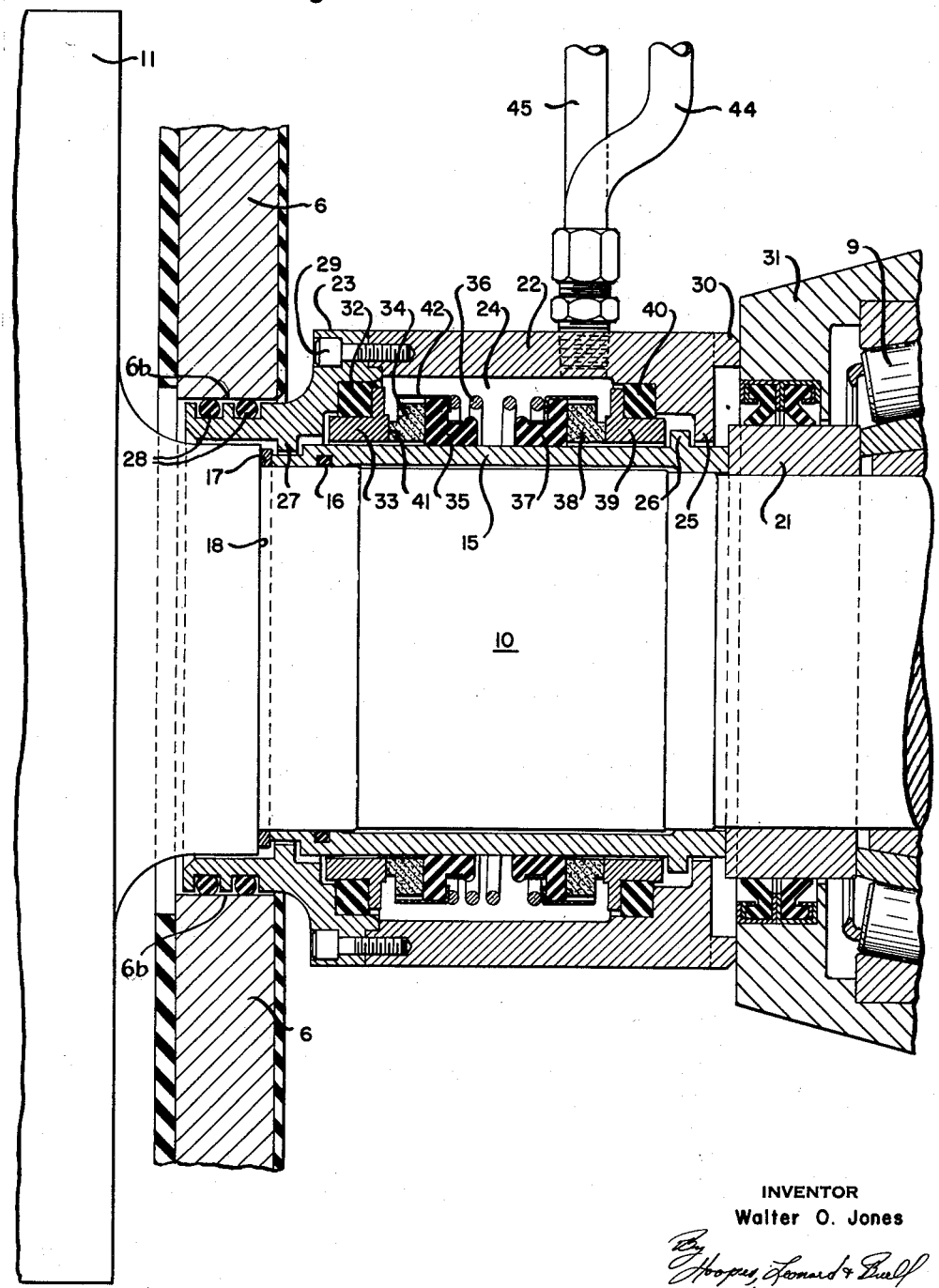

In the accompanying drawings I have illustrated a present preferred embodiment of my invention in which Figure 1 is a sectional view of a portion of a liquid treatment tank having an opening with a shaft therethrough and a seal embodying my invention; and Figure 2 is a view in greater detail of the seal and associated elements shown in Figure 1.

In Figure 1, I have shown one-half of a tank used for treatment of metallic strip. Such a tank may contain an acid or caustic solution for cleaning the strip or an electrolyte for the electrolytic deposition of a metal on the surface of the strip. The tank, which is indicated generally at 1 comprises a structural portion 2 of steel lined in rubber 3 or some other material which will resist attack by the solution contained in the tank. Pipes 4 and 5 are provided for adding, circulating and withdrawing the solution in the tank and are connected to supply and drain lines for that purpose. The side of the tank has a large hole formed in it around the edge of which a mounting member 6a is positioned. A bushing 6 is sealed in the mounting member forming a cylindrical opening in the side of the tank. The edge of the opening is indicated at 6b. Mounting member 6a is rigidly fixed to the side of the tank and is sealed thereto by a gasket 7. The mounting member also serves as a bearing mount and has a cup-shaped portion 8 beneath the seal which will presently be described.

A roller bearing 9 is mounted in mounting member 6a and has the neck 10 of roll 11 journaled in it. It will be understood that the opposite side of the tank, which is not illustrated in the drawings, is similar to that side which is shown. Roll 11 is a guide roll under which the strip passes to form the lower end of the loop. Strip passing through such treatment tanks is customarily passed over a plurality of upper and lower guide rolls to form a series of loops. Roll 11 is a lower guide roll and defines the bottom of one of the loops. A strip guide 12 has a flanged edge 13 on each side which aids in holding the strip centered and prevents it from drifting to either end of roll 12. A V-belt pulley 14 is mounted on the end of roll neck 10 and is driven from an electric motor (not shown).

A sleeve 15 surrounds a portion of roll neck 10 and is sealed to the neck of the roll by an O-ring 16 and a gasket 17 between sleeve 15 and shoulder 18 of the roll. Sleeve 15 is drawn tight against gasket 17 by nut 19 which is drawn up tight against tapered sleeve 20, spacer 21 and sleeve 15. A cartridge 22 generally surrounds sleeve 15 and with retainer 23, forms a cavity 24 surrounding the sleeve. A shoulder 25 on cartridge 22 has a smaller internal diameter than the external diameter of a projection 26 on sleeve 15. In like manner, shoulder 27 of retainer 23 is of smaller diameter than the principal portion of sleeve 15. Retainer 23 is sealed to bushing 6 by two O-rings 28 which are in contact with the edge 6b of the opening in bushing 6. Retainer 23 and cartridge 22 are fastened together by set screws 29. An annular ring 30 formed on the end of cartridge 22 away from the tank is slotted, and the slots engage lugs on bearing mounting 31.

The rotary seal components are located within cavity 24. They comprise a gasket 32 which may, for example, be of neoprene, seat 33, of Monel or other like non-corrosive material, a seal 34, which is preferably of carbon, a sealing ring 35, which may be of neoprene, a spring 36, a sealing ring 37, a seal 38, a seat 39 and gasket 40. Gasket 40 bears against the end of cartridge 22. Spring 36 is in compression between retainer rings 42 which bear against sealing rings 35 and 37. Spring 36 holds the entire assembly in compression between cartridge 22 and retainer 23. Gasket 32 is in sealing relationship to retainer 23 and seat 33. The inner face 41 between seal 34 and seat 33 is smooth and permits rotational motion between the two elements, seat 33 and seal 34. Retainer ring 42 surrounds seal 34 and sealing ring 35. It serves as a seat for compression spring 36 and holds sealing ring 35 against spreading as well as maintaining seal 34 and sealing ring 35 in unit relationship. Sealing ring 35 is of neoprene or some like material and under pressure will seal tight against both seal 34 and sleeve 15.

The matching faces of seat 33 and carbon seal 34 are ground smooth to permit sliding rotational motion between them as heretofore stated. Their finish is such that they also act to prevent passage of fluid while they are rotating with respect to one another.

It will be observed that the remaining elements in cavity 24 are similar to those heretofore described. In like manner sealing ring 37 seals against sleeve 15 and carbon seal 38. The surface between carbon seal 38 and seat 39 is a smooth one permitting relative rotational motion. Gasket 40 is sealed against seat 39 and cartridge 22.

A supply tank 43 is filled with distilled water and is located higher than the level of liquid in tank 1. It is connected to cavity 24 by pipe 44. A second pipe 45 is likewise connected to cavity 24 and terminates at an overflow 46 which is above the level of the liquid in tank 1 but below supply tank 43.

Roll 11, guide 12 and bushing 6 are all installed in the tank after it has been erected. The neck of the roll may be supported by temporary shoring. The seal assembly is, in the meantime, assembled in a shop on a bench without the interruption of other construction work or the necessity of fitting heavy parts. Sleeve 15 and cartridge 22 are placed in proper relationship. Before installation of retainer 23, gasket 40, seat 39, seal 38, sealing ring 37, retainer ring 42, spring 36, retainer ring 42, sealing ring 35, seal 34, seat 33 and gasket 32 are loaded into cavity 24 in that order. Retainer 23 is then placed in position and locked in place by set screws 29, compressing spring 36 and placing all the components within the cavity in compression. Shoulders 25 and 27 will maintain sleeve 15 in fixed position to cartridge 22 and retainer 23. The seals and associated elements will, therefore, remain in cavity 24 and the entire assembly may be shipped as a unit to the point of erection of the tank. The complete assembly is then slipped over the roll neck 10 and fitted into position as shown in the drawings. O-ring 16, O-rings 28, and gasket 17 are placed in position during this process. Spacer 21, tapered sleeve 20 and roller bearing 9 are fitted in place and nut 19 is drawn tight. The drive pulley is then installed. Pipes 44 and 45 are connected to the cartridge and the apparatus is ready for use.

Tank 1 is filled with whatever liquid is being used for treatment of the strip. It may, for example, be an acid pickling solution or an electrolyte for electroplating. Distilled water is maintained in the supply tank and fed to cavity 24 through pipe 44. A continuous circulation of distilled water is maintained into cavity 24 through pipe 44 and upwardly through pipe 45. Since overflow 46 is at a higher level than the liquid in tank 1, cavity 24 will have a higher head than the tank at the same point. Thus liquid leakage through the seal, which is inevitable to some extent, will be inwardly from cavity 24 into tank 1. The result is that the pickling solution or electrolyte will be diluted with distilled water but will not be contaminated. Leakage outwardly will be only of distilled water, which will not attack the bearings or surrounding elements. Such leakage is caught in cup-shaped portion 8 of bushing 6 and will be conducted away through outlet 8a.

When roll 11 is driven from pulley 14 frictional force will cause sleeve 15, sealing rings 35 and 37, seals 34 and 38, retainers 42 and spring 36 to rotate with the shaft. Cartridge 22 and retainer 23 will be held against rotation by the lugs engaging the slotted portion of annular ring 30. Frictional forces will hold gaskets 32 and 40 and seats 33 and 39 stationary against retainer 23 and cartridge 22. Thus there will be rotational slippage between seat 33 and seal 34 and between seat 39 and seal 38. Leakage from the cavity will be outward principally between the rotating and stationary faces into tank 1 and cup 8.

While I have illustrated and described a present preferred embodiment of my invention, I do not limit myself thereto, and it will be understood that my invention may be otherwise variously practiced within the scope of the following claims.

I claim:

1. Means for sealing a rotating shaft to the edge of an opening in a wall comprising a sleeve surrounding said shaft and removable from an end thereof, gasket means intermediate the sleeve and shaft effecting a seal therebetween, cartridge assembly means surrounding the sleeve, means on said cartridge assembly means engaging the sleeve and holding the sleeve and cartridge assembly means against appreciable relative longitudinal movement, means sealing the cartridge assembly means to said edge, opposed gasket means surrounding the sleeve and within the cartridge assembly means, a circular seal backing against each said opposed gasket means, seal seating means in contact with said seals, gasket means intermediate the seal seating means and the cartridge means, and means urging the opposed gasket means apart, thereby holding the circular seals and associated seal seating means in contact.

2. Means for sealing a rotating shaft to the edge of an opening in a wall comprising a sleeve surrounding said shaft and removable from one end thereof, gasket means intermediate the sleeve and shaft effecting a seal therebetween, a cartridge surrounding the sleeve, retainer means abutting one end of the cartridge, means on the assembly which comprises said cartridge and retainer engaging the sleeve and holding the sleeve and said assembly against appreciable relative longitudinal movement, means sealing the retainer means to said edge, a seal seat adjacent one end of said assembly and positioned within said assembly, gasket means sealing said seat to said end, a second seal seat adjacent the other end of said assembly, gasket means sealing said second seat to said adjacent end, a seal member surrounding said sleeve in rubbing contact with one of said seats, a second seal member surrounding the sleeve in rubbing contact with the other of said seats, gasket means sealing said seal members to the sleeve, and means urging said seals against their respective seats.

3. Means for sealing a rotating shaft to the edge of an opening in a wall comprising a sleeve surrounding said shaft and removable over at least one end thereof, a cartridge surrounding the sleeve, retainer means abutting one end of the cartridge and forming a unitary structure therewith, said sleeve, retainer means and cartridge being placed to form a cavity therebetween, means holding the sleeve, retainer means and cartridge against appreciable relative longitudinal movement, circular seat means within the cavity at each end thereof in sealed frictional relationship to the cartridge and retainer structure, a circular seal means surrounding the sleeve and in rubbing contact with each said seat means, the seal means being in frictional relationship to the sleeve, and means urging the seals in opposite directions against their respective seats.

4. Means for sealing a rotating shaft to the edge of an opening in a wall through which the shaft projects comprising a sleeve surrounding the shaft and removable from one end thereof, said sleeve being in frictional sealed relationship to the shaft, a cartridge surrounding the sleeve, retainer means in frictional sealed relationship to the edge of the opening but removable therefrom, said cartridge, sleeve and retainer means comprising an interlocked assembly forming a cylindrically shaped cavity therebetween, means holding the cartridge, sleeve, and retainer means against appreciable relative longitudinal movement, seal means within said cavity comprising gasket means adjacent one end of said cartridge in sealing relationship thereto, seal seat means abutting said gasket, seal means in rubbing relationship to the seat means, second gasket means sealing said seal to the sleeve, third gasket means opposed to the second gasket means, second seal means abutting the third gasket means and sealed to the sleeve thereby, second seat means in rubbing relationship to the second seal means, fourth gasket means adjacent the second seat means and in sealing relationship to the second seal and the cartridge, and means urging the second and third gasket means apart whereby the seals are maintained in firm contact with their respective seats.

5. Means for sealing a rotating shaft to the edge of an opening in a wall comprising a sleeve surrounding said shaft and removable over at least one end thereof, a cartridge surrounding the sleeve, retainer means abutting one end of the cartridge and forming a unitary structure therewith, said sleeve, retainer means and cartridge being interlocked in an assembly forming a cavity therebetween, means on the structure which comprises the retainer means and cartridge engaging the sleeve and holding the sleeve and the cartridge against appreciable relative longitudinal movement, circular seat means within the cavity at each end thereof in sealed frictional relationship to the cartridge and retainer structure, circular seal means surrounding the sleeve and in rubbing contact with each said seat means, the seal means being in frictional relationship to the sleeve, means urging the seal means against the seat means, and means to supply fluid to said cavity at a greater pressure than the pressure on the other side of the wall from said assembly.

References Cited in the file of this patent

UNITED STATES PATENTS

| | | |
|---|---|---|
| 2,000,293 | Morrow | May 7, 1935 |
| 2,427,656 | Blom | Sept. 23, 1947 |
| 2,479,711 | Arutunoff | Aug. 23, 1949 |
| 2,531,079 | Payne | Nov. 21, 1950 |
| 2,672,357 | Voytech | Mar. 16, 1954 |
| 2,723,868 | Hartranft | Nov. 15, 1955 |